United States Patent [19]
Leibengood

[11] Patent Number: 5,435,119
[45] Date of Patent: Jul. 25, 1995

[54] LAWNMOWER HANDLE RELEASE

[76] Inventor: Raymond Leibengood, 1008 Jodi, Copperas Cove, Tex. 76522

[21] Appl. No.: 301,296

[22] Filed: Sep. 6, 1994

[51] Int. Cl.⁶ ............................................. A01D 34/00
[52] U.S. Cl. ................................. 56/16.7; 56/DIG. 8
[58] Field of Search ...................... 56/10.1, 10.8, 14.7, 56/15.1, 16.7, 17.1, 17.2, DIG. 8

[56] References Cited

U.S. PATENT DOCUMENTS

| | | | |
|---|---|---|---|
| 2,786,694 | 3/1957 | Gray | 56/16.7 X |
| 2,791,437 | 5/1957 | Knarzer | 546/16.7 X |
| 5,163,275 | 11/1992 | Hare et al. | 56/16.7 |

Primary Examiner—Michael Powell Buiz

[57] ABSTRACT

A lever (10) is fastened by its bottom end to a lawnmower handle with connector (14) and clamp (12). It also has fastened to it, about one quarter of the way from the bottom end, another connector (14) which is fastened to the two lower ends of said mower handle in such a way that when lever (10) is pulled, pressure is transmitted to said handle ends, either squeezing them together or forcing them apart. This action causes said handle to become disengaged from the mower frame. Said handle can then be raised to the vertical position for storage.

5 Claims, 4 Drawing Sheets

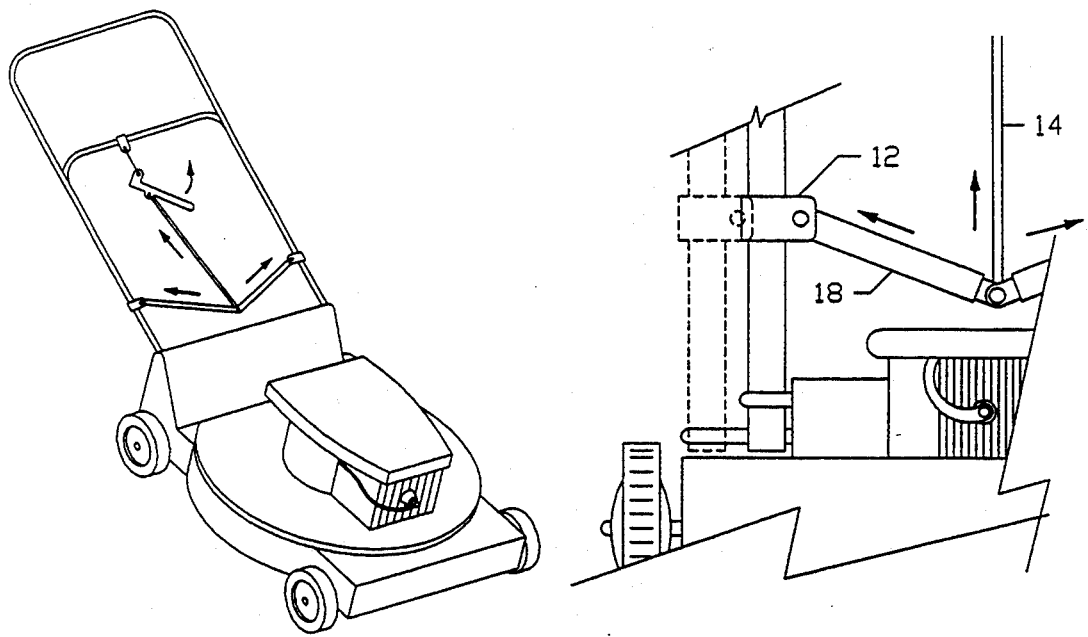
FIG. 4B
FIG. 4C
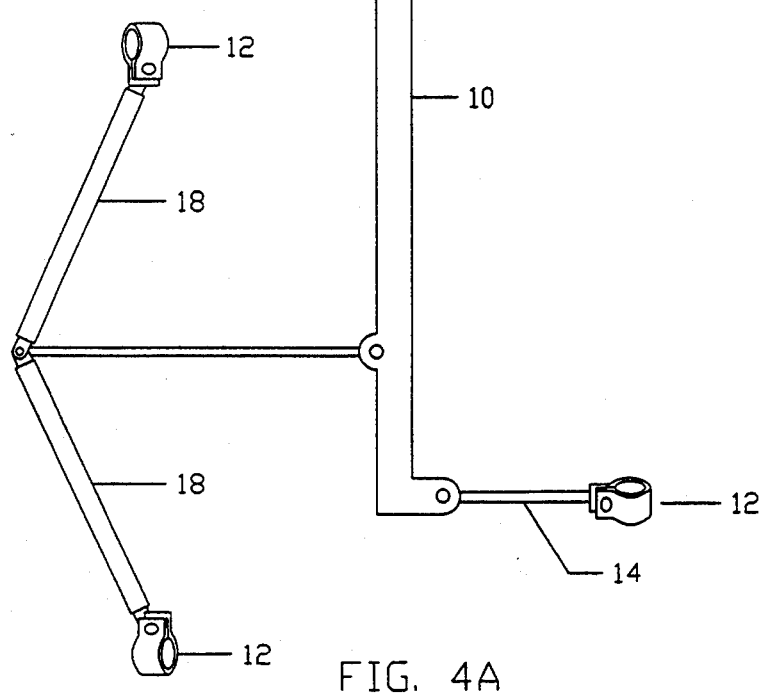
FIG. 4A

LAWNMOWER HANDLE RELEASE

BACKGROUND—FIELD OF INVENTION

This invention relates to lawnmowers, specifically to the releasing of a lawnmower handle so it may be raised to the vertical position for storage. Basically, it is a lever fastened between the two vertical arms of a lawnmower handle and connected to the two lower handle ends where they are connected to the mower frame.

BACKGROUND—DESCRIPTION OF PRIOR ART

After a person finishes cutting his lawn, the lawnmower is usually stored in a shed or garage. In most cases the handle is raised to the vertical position to reduce storage space. With the newer mowers, it is almost impossible for most people to squeeze the bottom ends of the mower handle together. This is necessary in order to disengage it from the mower frame so it may be raised. Most handles are made of heavy steel with diameters of 15/16 to one inch.

Much research was done on this to find any prior art. The lawnmowers in a Sears store was checked along with numerous hardware stores, department stores and catalogs. Nothing in this catagory could be found.

OBJECTS AND ADVANTAGES

Accordingly, the most outstanding object and advantage of my handle release is that it allows any person large enough to mow a lawn to be able, with ease, to disengage the handle so it may be raised for storage. In fact, it was found that the handle could be manipulated with only one hand.

DRAWING FIGURES

In the drawings, FIGS. 1A, 2A, 3A and 4A, show the handle release itself depicted in four different variations. They all work the same but are attached differently.

FIGS. 1B, 2B, 3B and 4B show the four configurations as installed on a lawnmower.

FIGS. 1C, 2C, 3C and 4C show, in detail, how the ends of the lawnmower handle are disengaged when pressure is applied to them from lever 10.

Reference Numbers in Drawings

| | |
|---|---|
| 10 lever | 12 clamp |
| 14 connector | 16 pulley |
| 18 rod | |

DESCRIPTION—FIGS. 1A, 2A, 3A, 4A

A typical embodiment of the handle release is illustrated in above figures. The handle release consists of a lever 10 of oval, round or square metal, wood or plastic. There are two connectors 14 fastened to the bosses on the bottom end of lever 10. The connectors 14 are made from nylon or steel cable or chain.

Figure 1B:
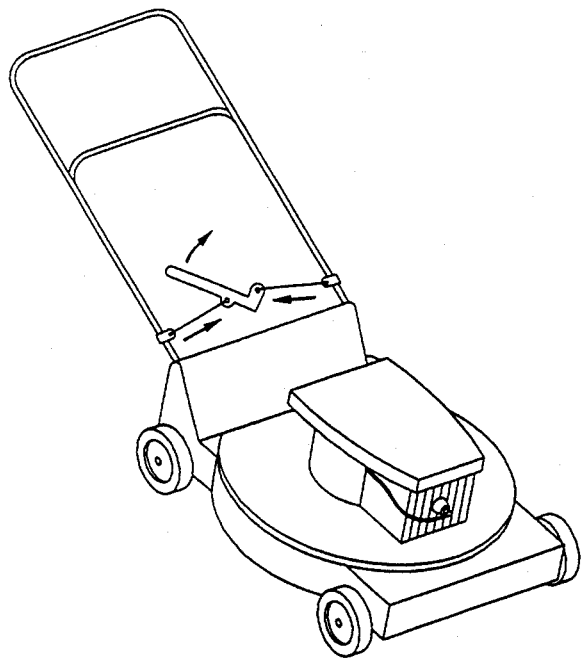
Figure 1C:
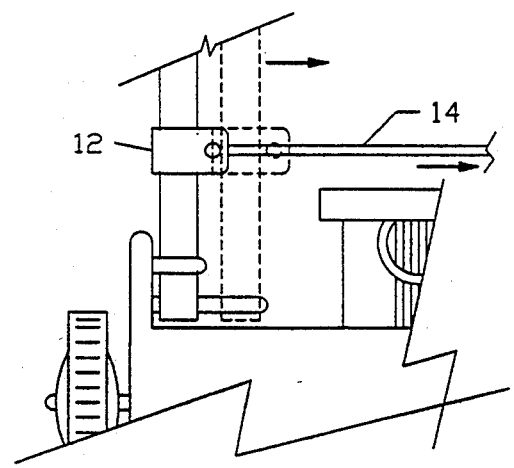
Figure 1A:
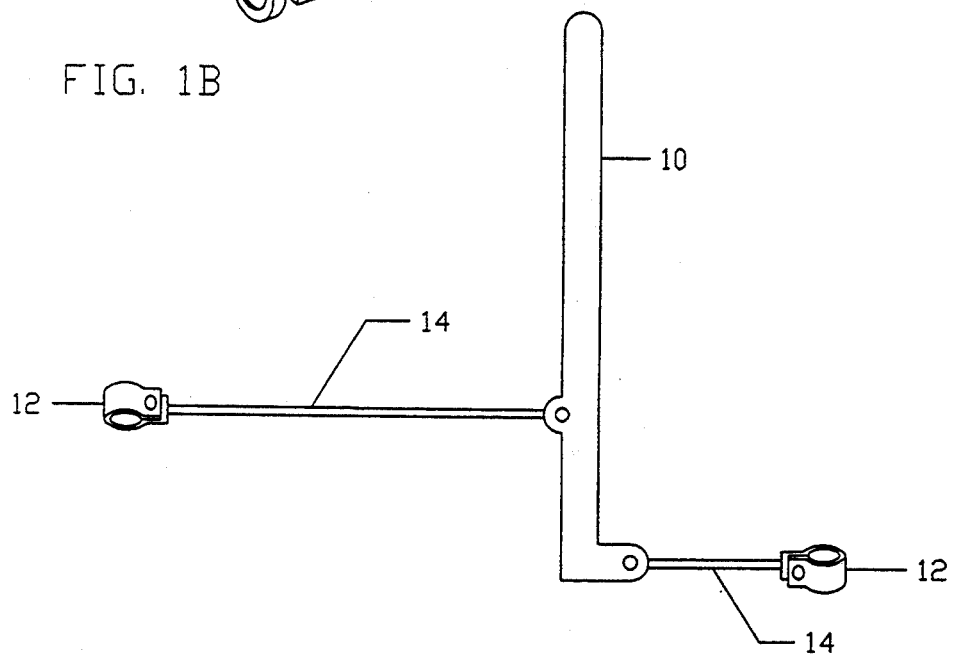

FIG. 1A shows one type of release connected to the lawnmower handle ends with two connectors 14 and two clamps 12. It is mounted low between the two lower handle ends.

Figure 2B:
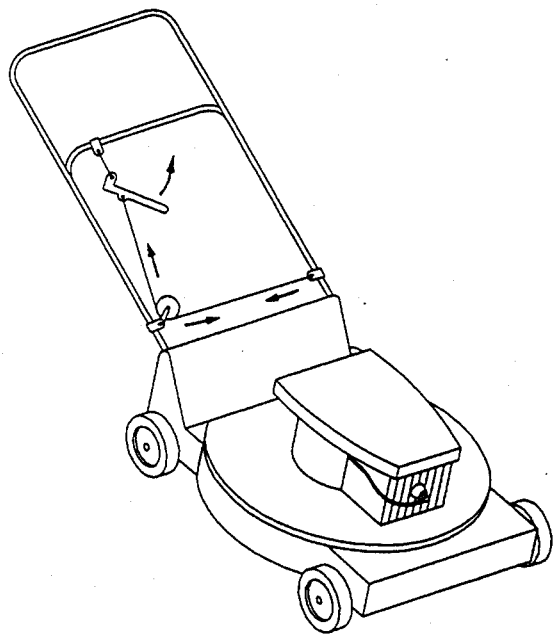
Figure 2C:
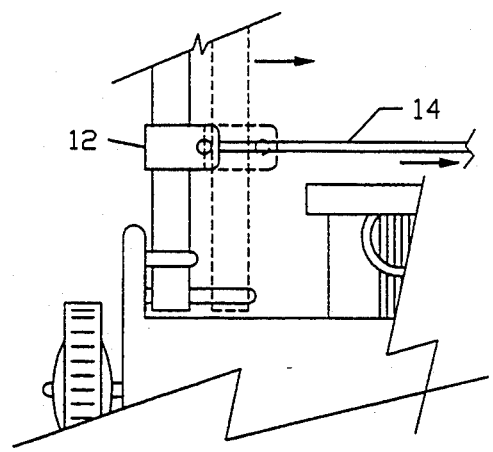
Figure 2A:
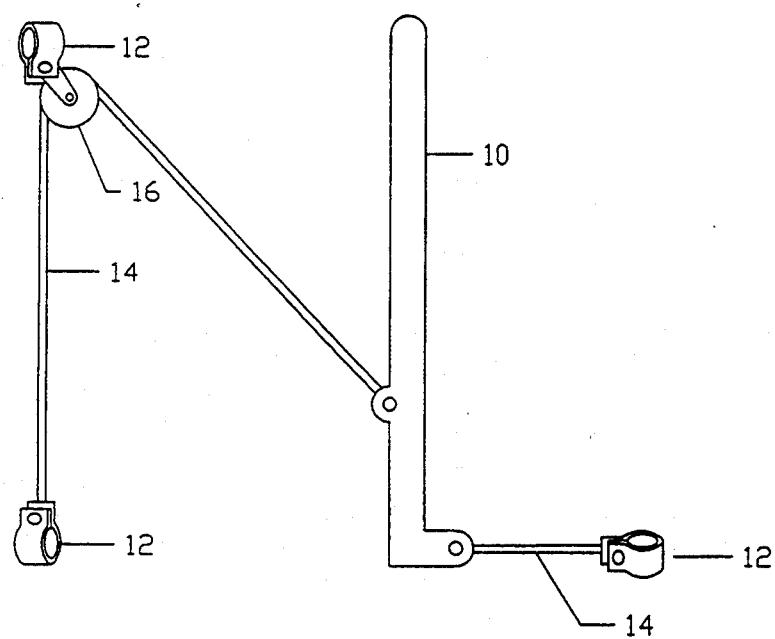

FIG. 2A shows another type of release with connector 14 running thru a pulley 16 which is connected to one end of the mower handle with clamp 12. It is then fastened to the other end of the mower handle by another clamp 12 lever 10 is mounted high, up on the crossbar.

Figure 3B:
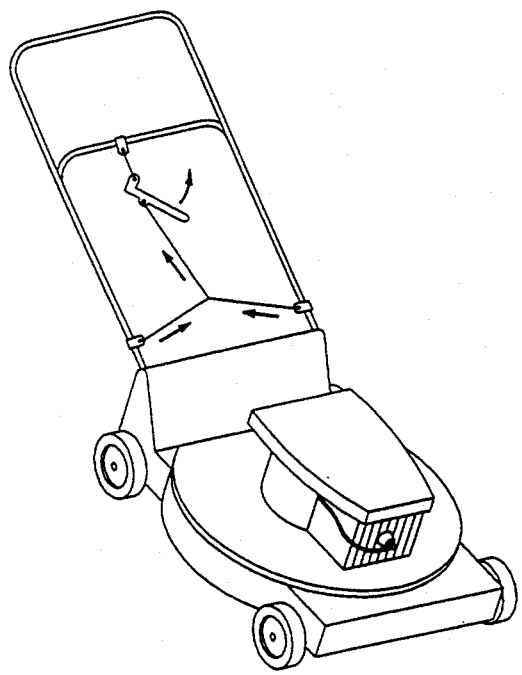
Figure 3C:
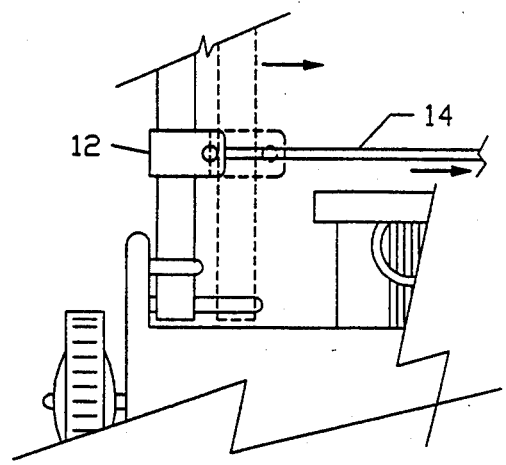
Figure 3A:
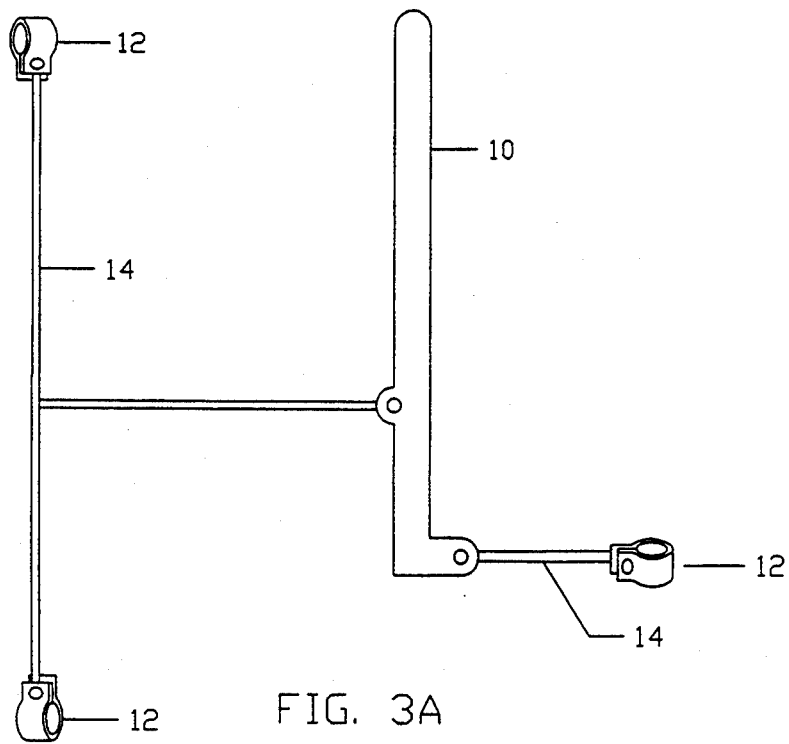

Another type of handle release is shown in FIG. 3A. It also is mounted up on the crossbar. A single connector 14 runs from lever 10 downward and is fastened to another connector 14 which runs between the two lower ends of the handle.

Another type of the handle release is shown in FIG. 4A. It is similar to the others except connector 14 is fastened to two rigid rods 18. The rod 18 is constructed from tubular steel, solid plastic or wood. The rods 18 are, in turn, fastened to the two ends of the mower handle by clamps 12.

Operation—FIGS. 1B, 2B, 3B, 4B

In FIG. 1B, by bending over slightly, one grasps lever 10 with one hand and holds onto the mower handle with the other hand. Slight pressure is used to pull lever 10, which causes the ends of the mower handle to move towards the center and unlatches them from the mower frame (see FIG. 1C). The handle can then be raised to the vertical position.

In FIGS. 2B and 3B

The operation is similar except one stands straight up while pulling up on to lever 10. The first three FIGS. (1B, 2B, 3B) are for use on lawnmowers with handles that move to the inside to disengage (see FIGS. 1C, 2C, 3C).

FIG. 4B is for use on a few mowers that must have the handle ends spread apart to be disengaged. It is operated the same. While standing straight, one pulls up on lever 10, which in turn, pulls on the center of rods 18, forcing rods 18 to push the handle ends outwardly to disengage from the frame (see FIG. 4C).

SUMMARY RAMIFICATIONS AND SCOPE

Accordingly, the reader will see that this handle release will enable anyone, regardless of being slight of statue or a weight lifter, to disengage these new heavyweight lawnmower handles and raise the handles for space saving storage.

The handle release will primarily be sold separately as a retro-fit item but could be factory installed on new mowers.

I claim:

1. In a lawnmower handle release device comprising of a ever communicating with the lower ends of said lawnmower handle by means of connecting devices and clamps;

The said lever is fastened either to the crossbar of said lawnmower handle or between the two lower ends of said handle;

A person pulls on said lever, which in turn, transmitts that pressure via a connector, to the two lower ends of said lawnmower handle;

That pressure forces the said two lower handle ends to be squeezed together on drawing 1, 2, and 3 or spread apart on drawing 4.

2. A lawnmower handle release device of claim 1, wherein said lever of claim 1 is comprised of strong rigid material.

3. A lawnmower handle release device of claim 1, wherein said lever is elongated and of sufficient cross-section to provide adequate strength when used.

4. A lawnmower handle release device of claim 1, wherein said connecting devices are comprised of strong flexible material.

5. A lawnmower handle release device of claim 1, wherein said clamps are comprised of strong material capable of being moulded or fitted around said lawnmower handle.

* * * * *